United States Patent [19]
Ricks et al.

[11] Patent Number: 5,658,199
[45] Date of Patent: Aug. 19, 1997

[54] TRIPOD JOINT WITH MECHANISM FOR SECURING THE ROLLERS

[75] Inventors: Michael Ricks, Nidderau; Norbert Hofmann, Ronneburg, both of Germany

[73] Assignee: Löhr & Bromkamp GmbH, Offenbach am Main, Germany

[21] Appl. No.: 515,852

[22] Filed: Aug. 16, 1995

[30] Foreign Application Priority Data

Aug. 19, 1994 [DE] Germany .................. 44 29 479.4

[51] Int. Cl.⁶ .................................................. F16D 3/205
[52] U.S. Cl. ................................................ 464/111; 464/905
[58] Field of Search ............................... 464/111, 123, 464/124, 132, 905

[56] References Cited

U.S. PATENT DOCUMENTS

| | | | |
|---|---|---|---|
| 4,747,803 | 5/1988 | Kimata et al. | 464/111 |
| 5,019,016 | 5/1991 | Uchman | 464/111 |
| 5,171,185 | 12/1992 | Schneider . | |
| 5,380,249 | 1/1995 | Krude | 464/111 |
| 5,391,013 | 2/1995 | Ricks et al. | 464/111 X |
| 5,507,693 | 4/1996 | Schwärzler et al. | 464/111 |
| 5,525,109 | 6/1996 | Hofmann et al. | 464/111 |

FOREIGN PATENT DOCUMENTS

| | | |
|---|---|---|
| 2668804 | 5/1992 | France . |
| 2681390 | 3/1993 | France . |
| 4130183A1 | 3/1993 | Germany . |
| 3936600C2 | 1/1994 | Germany . |
| 4305278C1 | 7/1994 | Germany . |
| 4331474A1 | 3/1995 | Germany . |
| 484923 | 7/1992 | Japan . |
| 2222659 | 3/1990 | United Kingdom . |
| 2259557 | 3/1993 | United Kingdom . |
| WO9531648 | 11/1995 | WIPO . |

Primary Examiner—Daniel P. Stodola
Assistant Examiner—Eileen A. Dunn
Attorney, Agent, or Firm—Harness, Dickey & Pierce, P.L.C.

[57] ABSTRACT

A tripod joint has an outer joint part with three circumferentially distributed, axis parallel recesses and an inner joint part. The inner joint part has a star-shaped cross-section with three circumferentially distributed arms which engage the recesses of the outer joint part. The roller assemblies are supported on the arms. Each roller assembly includes a roller carrier and a roller rotatably supported by a needle bearing on the roller carrier. The rollers are pivotably arranged relative to the respective arms so as to be axially and angularly movable relative to the arm axis. The rollers have running faces, which are loaded under torque transmission, and end or annular faces, which adjoin the running faces on the radial outside and inside with reference to the joint axis. The annular faces, in cross-section through the outer joint part, are complementary to the outer joint part, axially relative to the roller axis and supportingly, come to rest in and against the outer joint part recesses. The running faces of the rollers have the shape of spherical segments. In a cross-section, through the outer joint part, the tracks in the recesses have the shape of concave circular segments. With reference to the roller axis, mutual axial securing mechanisms, between each roller carrier and roller, are formed in both directions entirely by two securing rings.

16 Claims, 2 Drawing Sheets

TRIPOD JOINT WITH MECHANISM FOR SECURING THE ROLLERS

DESCRIPTION

The invention relates to a tripod joint having an outer joint part with three circumferentially distributed, axis parallel recesses. The tripod joint has an inner joint part with a star-shaped cross-section and which includes three circumferentially distributed arms engaging the recesses of the outer joint part. Roller assemblies are supported on each arm. Each roller assembly includes a roller carrier and a roller rotatably supported by a needle bearing on the roller carrier. The rollers are pivotably arranged relative to the respective arms to be axially and angularly movable relative to the arm axis. The rollers include running faces which are loaded under torque transmission. The rollers also include end or annular faces which adjoin the running faces on the radial outside and inside with reference to the joint axis. The annular faces, via portions, in cross-section through the outer joint part, are complementary to the outer joint part, axially relative to the roller axis and supportingly, come to rest in and against the recesses.

JP 4-84923 U published Jul. 23, 1992, discloses a tripod joint where the roller, on its outside, is cylindrical and engages tracks, in the form of rectangular grooves, in the outer joint part recesses. The roller shape has a great disadvantage in that, depending on the position of the tripod arm within the roller assembly, high edge loads may occur at the roller. With this type of form-fitting engagement there is an inherent risk of the roller tilting in the tracks. The rollers are axially fixed relative to the roller carriers by one single securing ring which constitutes a first stop for the needles of the needle bearing. A second stop for the needles of the needle bearing, with reference to the roller axis, is provided in the form of a radially outwardly projecting collar at the roller carrier.

Tripod joints of a similar type are described in DE 41 30 183 published Mar. 18, 1993. The various assemblies as referred to therein have one feature in common, for the purpose of axially securing the rollers on the roller carrier, they include, with reference to the roller axis, either a securing ring at each end or a securing ring at one end and a collar at the other end. Unilaterally axially loaded securing rings are combined with supporting discs.

The axial securing means provided between the roller carrier and roller take up a considerable amount of axial space which is lost for the available bearing face. If, at one end, a one-piece collar is provided at the roller carrier, machining of the cylindrical outer face, which serves at the bearing face, is rendered more expensive and more complicated. When the roller rotates on the roller carrier, the amount of friction in the region of the securing means is considerable.

To the extent that use is made of rollers whose running faces, in the shape of spherical segments, would permit a pivot movement in the tracks for the purpose of supporting the roller assembly relative to the respective recesses, a contact is provided between the roller carrier and recesses in the region of the end and annular shoulder faces of the roller carrier. In a section through the roller axis, the shoulder faces project beyond the contour of the roller. When the joint is articulated, this leads to relative sliding movements between the outer joint part and the roller carrier which does not rotate when it moves longitudinally in the recess.

DE 43 05 278 C1 and JP U 4-84923 both describe tripod joints whose rollers comprise running faces which are held in a form-fitting way in the tracks of the recesses of the outer joint part to prevent any tilting movements. The roller carriers are axially secured relative to the rollers by a collar region. The collar region is provided by carrying out a turning operation on the rollers and roller carriers respectively.

SUMMARY OF THE INVENTION

It is an object of the present invention to provide a tripod joint which improves the roller assembly with respect of friction conditions, utilization of space and longitudinal guidance in the outer joint part and to reduce the production costs of the roller assembly.

The objective is achieved by the running faces of the rollers having the shape of spherical segments. Also, in a cross-section through the outer joint part, the tracks in the recesses have the shape of concave circular segments. Further, with reference to the roller axis, mutual axial securing means are formed in both directions entirely by two securing rings between each roller carrier and roller.

In a further solution, the roller carrier is contact-free relative to the recesses in the outer joint part. The rollers are supported against tilting movements only between the annular faces and the supporting portions of the recesses. The mutual axial securing means between each roller carrier and roller, with reference to the roller axis B, are formed in both directions exclusively by one of the securing rings.

Finally, in another solution, the roller carrier is contact-free relative to the recesses in the outer joint part. The rollers are supported against tilting movements only between the annular faces and the supporting portions in the recesses. The mutual axial securing means between each roller carrier and roller, with reference to the roller axis B, are formed in both directions exclusively by one of the securing rings. The outer face of each roller carrier is cylindrical along its entire height. Each roller carrier is embraced at both ends from the outside by the securing rings in the direction of the roller axis B. Two annular grooves to receive the securing rings are provided in the inner face of a roller. Thus, the mutual securing means, between each roller carrier and roller, are formed by two securing rings each effective in one direction only along the roller axis B.

The means proposed here ensure optimum contact between the roller assemblies and tracks in the recesses of the outer joint part. The contact is limited entirely to the rotatably supported rollers. The selected shape of the running faces makes it completely impossible for the rollers to tilt in the region of their force transmitting surfaces. The rollers are supported and prevented from tilting in the tracks by providing separate end or annular faces at the roller outside the running faces, which cooperate with corresponding counter faces in the outer joint part recesses. With the help of this measure, the mutual axial securing means, between the roller carrier and roller with reference to the roller axis, are simplified down to the simplest design. The collar at the roller carrier, or supporting discs are eliminated.

The radially outer supporting faces in the recesses, with reference to the joint axis, may extend perpendicularly relative to the roller axis. The outer supporting faces cooperate with a planar end face of the roller. As a result, guidance of the rollers in the recesses of the outer joint part is qualitatively improved. This improvement is due to the fact that guidance takes place at the roller on a surface, the diameter of which is greater than the diameter of an outer end face of the roller carrier. The supporting lengths of the rollers, relative to the outer joint part, can be increased in this region. By supporting the roller assembly on a larger diameter, the friction forces and thus the joint excitation forces are reduced.

The radially inner supporting faces in the recesses, with reference to the joint axis, may be arranged wedge-like symmetrically relative to one another with reference to the joint axis and cooperate with a conical annular face at the roller. One of the faces may be slightly spherical in cross-section relative to the other. Again, the roller is supported on a surface with a large diameter, so that radially inwardly, with reference to the joint axis, the supporting lengths of the rollers relative to the outer joint part are very great.

As a result of the shape of the supporting annular faces and the load transmitting spherical running faces, which cooperate with the concave circular segment shaped tracks adapted in the cross-section through the joint, the risk of tilting is largely eliminated.

According to a preferred embodiment, the mutual securing means, between each roller carrier and roller, are formed by two individual securing rings. Each ring is loaded and effective in only one direction. In this way, the shape of the roller carrier can be simplified. Further if, at the same time, the annular grooves to receive the securing rings are provided in the inner roller face, the securing rings only come into contact with the end faces of the roller carrier.

The securing rings may preferably be fixed in separate annular grooves in the roller. It is also possible to arrange the securing rings, together with the needles of the needle bearing, in a common recess in the roller. Thus, there is no need for any further profiling of the inner face of the roller or the outer face of the roller carrier.

The above conditions as prevailing at a roller and roller carrier may be interchanged as long as it is ensured that the height of the roller carrier, as compared to the geometry of the roller in the cross-section through the joint, is so small that the supporting contact of the roller assembly in the recess is provided entirely by the roller.

The radially opposed faces of the roller parts, the outer face of the roller carrier and the inner face of the roller, may be largely cylindrical. This greatly facilitates the machining operation. By reducing the amount of machining required and by saving additional securing parts, costs are considerably reduced.

By reducing the number of securing elements, while the size of the bearing face for the needle bearing remains unchanged, it becomes possible to axially shorten the roller assembly. In consequence, the supporting faces for the rollers provided on the radially inwardly portions, with reference to the joint axis, and adjoining the tracks in the outer joint part may be displaced radially outwardly by a corresponding amount. As a result it is possible to increase the inner diameter of the outer joint part, thus achieving an increase in the angle/plunge capacity of the joint. Thus, with the same outer diameter and a predetermined plunging distance, the articulation angle of the joint may be increased. At the same time, the free space provided by reducing the extent of the securing means enables the supporting faces, for the rollers at the radially inner edges of the tracks, to be designed as explained above.

In a further embodiment, the recess to receive the needle bearing may be provided either in the inner face of the roller or in the outer face of the roller carrier. In this way, it is possible to use only the securing rings to secure the roller relative to the roller carrier and to guide the housing of the bearing needles separately therefrom in the axial direction with reference to the roller axis.

It is advantageous to design the securing rings such that each securing ring includes a gap whose width b is smaller than 60% of the diameter d of a needle of the needle bearing. It is particularly advantageous for the direction of the gap to extend at an angle relative to the radial ray from the roller axis through the gap. The shape and width of the gap of the securing ring prevent the needles of the needle bearing from pressing out of the roller assembly.

Additional objects and advantages of the invention will be apparent from the detailed description of the preferred embodiment, the appended claims and the accompanying drawings, or may be learned by practice of the invention.

BRIEF DESCRIPTION OF THE DRAWINGS

Preferred embodiments of the invention are illustrated in the drawing wherein.

DETAILED DESCRIPTION OF THE PREFERRED EMBODIMENT

Figure 1A:
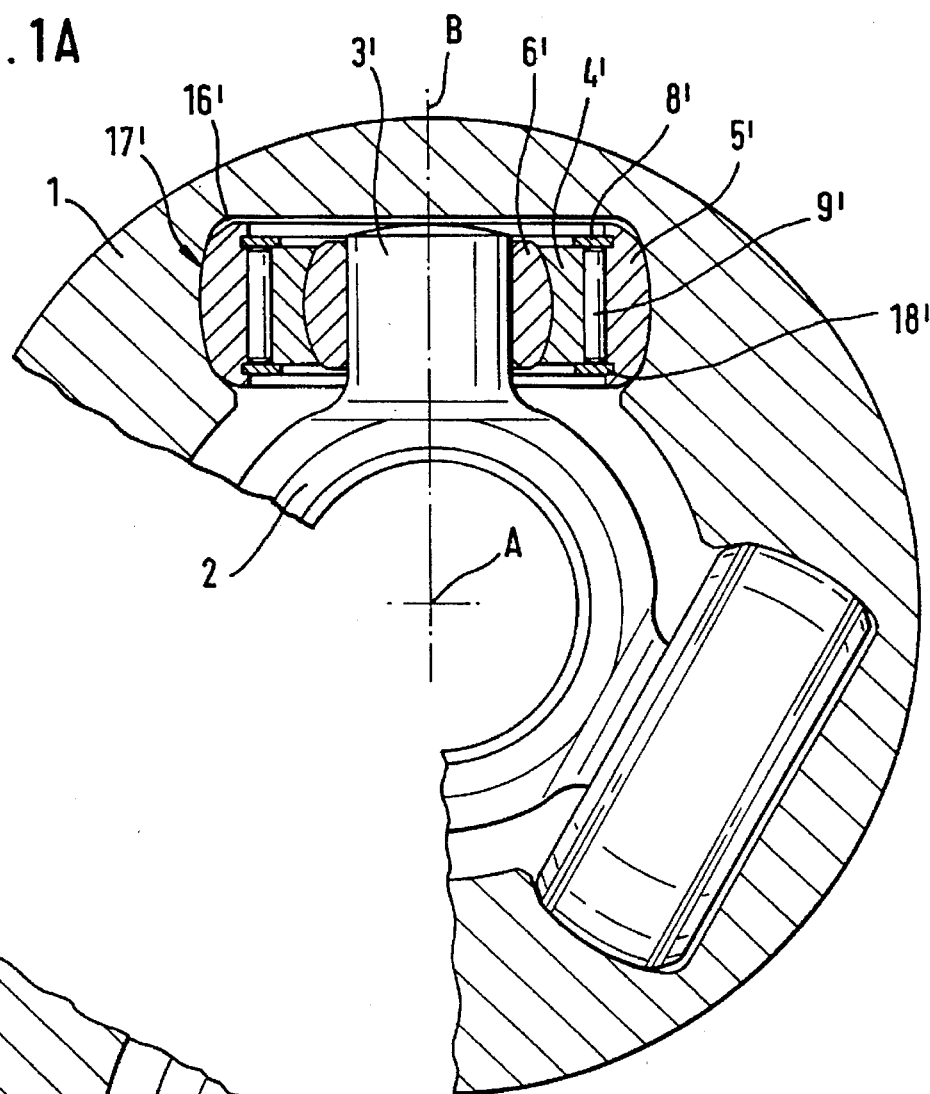
FIG. 1a is a cross-section view through a tripod joint in accordance with the invention in one embodiment.
Figure 1B:
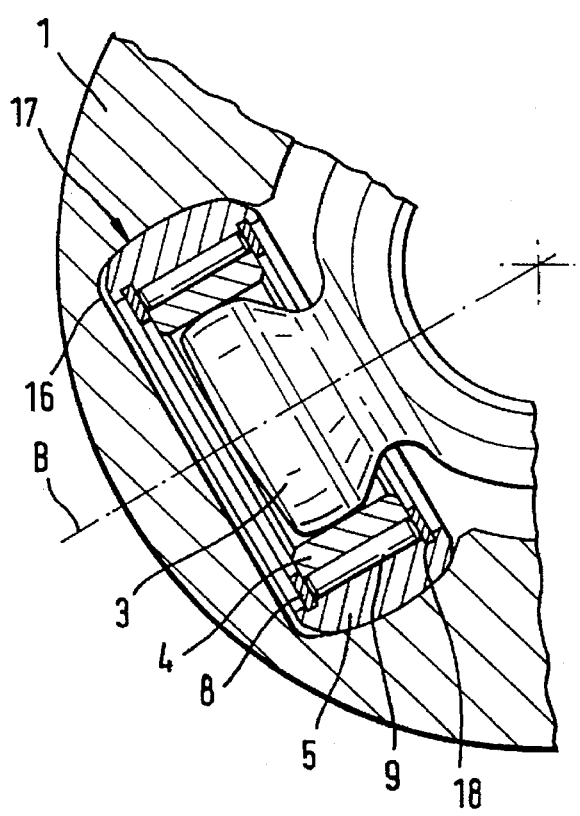
FIG. 1b is a cross-section view through a tripod joint in accordance with the invention in another embodiment.

FIG. 1 illustrates a tripod joint including an outer joint part 1 and an inner joint part 2. The inner joint part 2 has arms 3, 3' which are arranged radially starlike with reference to the joint axis A. Each arm carries a roller assembly 17, 17'. The roller assembly 17, 17' is pivotable and axially movable relative to the arm. The roller assemblies 17, 17' each include a roller carrier 4, 4', a needle bearing 9, 9' and a roller 5, 5' rolling directly in the respective recess 16, 16' of the outer joint part.

The roller assembly embodiment illustrated in the upper half of the section of FIG. 1 is guided on an entirely cylindrical arm 3' of the inner joint part 2. The roller carrier is in two parts and includes an inner ring 6', with a cylindrical through bore, and a spherical outer face. The inner ring engages a calotte face of the roller carrier 4'. On the cylindrical arm 3', the inner ring 6' is movable radially with reference to the joint axis A. The roller carrier 4' is pivotable on the inner ring 6' in all directions.

The roller assembly embodiment shown on the lefthand side of the cross-section of FIG. 1 is pivoted with a spherically ending arm 3 of the inner joint part 2. The arm engages an inner cylindrical through-aperture of a one-part roller carrier 4. On the arm 3, the roller carrier 4 is movable radially with reference to the joint axis A and also pivotable thereon in all directions.

In both embodiments, the roller, relative to the roller carrier, is held axially with reference to the roller axis B such that the securing rings engage annular grooves in the roller 5, 5' and embrace the respective roller carrier 4, 4' from both ends along the roller axis B. With the exception of the annular grooves, the inner face of the roller is purely cylindrical. The outer face of the roller carrier is completely cylindrical. The roller carrier 5 constitutes a purely cylindrical sleeve of the same wall thickness. The roller carrier 5', on the other hand, comprises an inner spherical face and the extended axial grooves for introducing the inner roller 6'.

Figure 2:
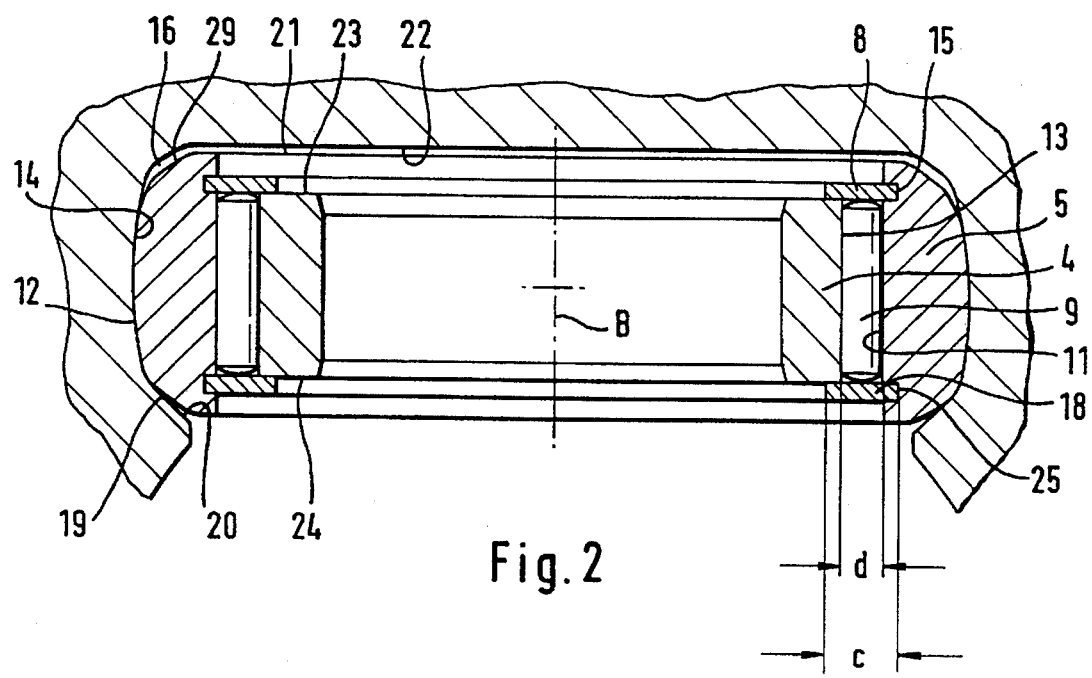
FIG. 2 is a cross-section view of a roller assembly of the tripod joint according to FIG. 1 with two securing rings embracing the roller carrier at both ends.

FIG. 2, in the form of a detail, shows a roller assembly according to the broken-out part of FIG. 1 on the bottom lefthand side. The roller assembly includes a roller carrier 4, a roller 5 and a needle bearing 9. In both directions, the roller 5 is secured by a securing ring 8, 18 along the roller axis B. The securing rings 8, 18 engage annular grooves 15, 25 in the roller 5 and embrace the roller carrier 4 from both ends with reference to the roller axis B. The securing rings 8, 18 rest on the end faces 23, 24 of the roller carrier 4.

The roller 5 includes a greater axial length than the roller carrier 4. The roller 5 is directly supported in the recess 16. Support is provided, radially inwardly with reference to the joint axis A, by a conical face 19 on shoulder faces 20 of the recess 16. The shoulder faces are arranged wedge-like relative to one another. Support is provided, radially outwardly with reference to the joint axis A, by its end face 21 on the base face 22 of the recess 16. Outward support could also be effected by a second conical face 29 of the symmetrical roller relative to further shoulder faces arranged symmetrically relative to the shoulder face 20. The securing ring 8 is loaded in its groove only radially outwardly by the roller carrier 4. The securing ring 18 is loaded in its annular groove 25 only radially inwardly by the roller carrier 4.

The running face 12 of the roller 5 forms a central spherical portion. The tracks 14 in the recess cooperating with the running face 12, in cross-section through the outer joint part, are circular portions and extend in the axial direction with reference to the joint axis A. Without the above-mentioned support the roller would not be able to pivot within the recess around all axes to any considerable extent.

Figure 3:
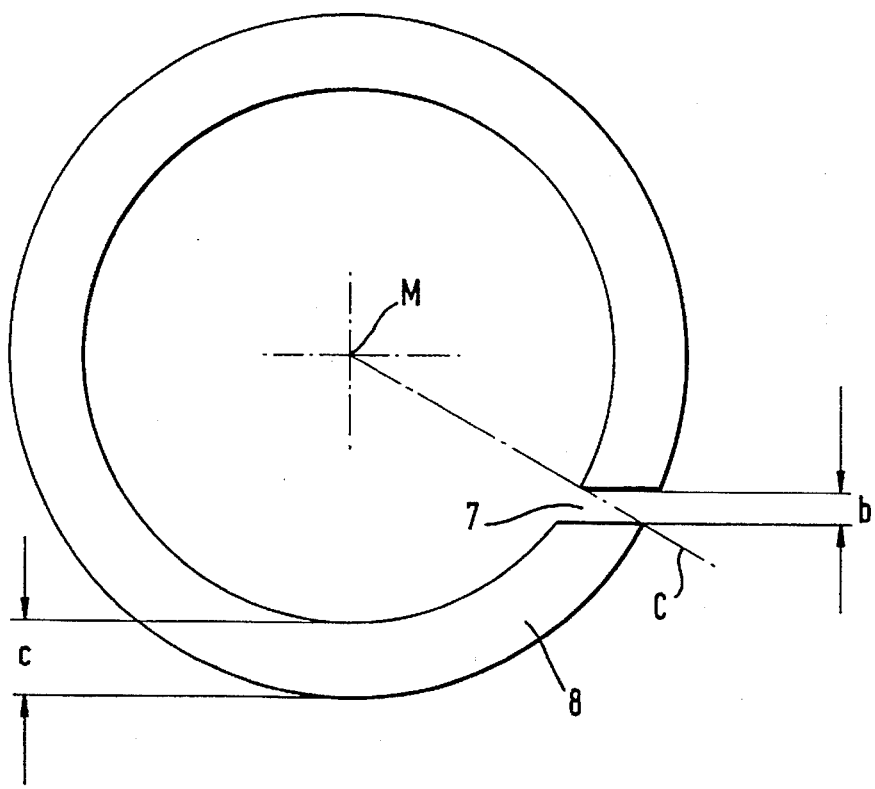
FIG. 3 is a half cross-section view through the roller assembly according to FIG. 2 and a plan view of a quarter of a securing ring.

FIG. 3 shows half a section through the roller assembly according to FIG. 2. Only a quarter of the securing ring is shown in plan view around the center M. It also shows a gap 7 which is required for fitting the ring 8 and which enables the ring to be compressed to the required extent to insert it into its annular groove 25. In the fitted condition, the width b of the gap 7 is smaller than or equal to 0.6 times the diameter d of the bearing needle 9. The width c of the securing ring 8 should preferably be greater than the diameter d of a bearing needle 9.

While the above detailed description describes the preferred embodiment of the present invention, the invention is susceptible to modification, variation and alteration without deviating from the scope and fair meaning of the subjoined claims.

We claim:

1. A tripod joint comprising:
   an outer joint part with three circumferentially distributed, axis-parallel recesses;
   an inner joint part with a star-shaped cross-section and three circumferentially distributed arms engaging the recesses of the outer joint part;
   roller assemblies supported on the arms, each roller assembly including a roller carrier and a roller rotatably supported by a needle bearing, each said roller pivotably arranged relative to each said respective arm so as to be axially and angularly movable relative to the arm axis, said rollers including running faces being loaded under torque transmission and annular end faces adjoining said running faces on both sides of said running faces, said recesses including tracks and portions on both sides of said tracks, which portions in a cross-section through the outer joint part, are complementary to said annular end faces, which annular end faces axially relative to the roller axis and supportingly, come to rest against said portions of the recesses, said running faces of the rollers have the shape of spherical segments and said tracks in the recesses have the shape of concave cylindrical segments and, securing means between each roller carrier and roller for mutual axial securing with reference to the roller axis, are formed in both directions entirely by two securing rings, wherein the securing means between each roller carrier and roller are formed by the two securing rings each effective in only one direction along the roller, wherein each roller has an inner face and two annular grooves for receiving the securing rings are provided in the inner face of each roller, and wherein each roller carrier is embraced axially at both ends by the securing rings.

2. A tripod joint according to claim 1, wherein each roller carrier has an outer face which is cylindrical.

3. A tripod joint according to claim 1, wherein with the exception of the annular grooves for the securing rings, the inner face of each roller is cylindrical along its entire height.

4. A tripod joint according to claim 1, wherein the securing rings each comprise a gap whose width is smaller than 60% of the diameter of a needle of the needle bearing.

5. A tripod joint according to claim 4, wherein the direction of the gap extends at an angle relative to a radial ray from the roller axis through the gap.

6. A tripod joint comprising:
   an outer joint part with three circumferentially distributed, axis-parallel recesses;
   an inner joint part with a star-shaped cross-section and three circumferentially distributed arms engaging the recesses of the outer joint part;
   roller assemblies being supported on the arms, each roller assembly including a roller carrier and a roller rotatably supported by a needle bearing on the roller carrier, each said roller being pivotably arranged relative to each said respective arm so as to be axially and angularly movable relative to the arm axis, said rollers having running faces which are shaped like spherical segments and whose sphere center is located on the roller axis, and tracks in the recesses, having concave cylindrical segments line-contacting the running faces of the rollers;
   supporting portions for the roller assemblies provided in the recesses so as to extend parallel to the tracks, each of the rollers including annular faces adjoining the running faces on both sides thereof, said roller carrier is contact-free relative to the recesses in the outer joint part, said rollers are supported against tilting movements only between the annular faces and the supporting portions in the recesses;
   and securing means between each roller carrier and roller, for mutual axial securing thereof with reference to the roller axis, are formed entirely by securing rings.

7. A tripod joint according to claim 6, wherein the securing rings are formed by two securing rings each effective in only one direction along the roller.

8. A tripod joint according to claim 6, wherein each roller has an inner face and two annular grooves for receiving the securing rings are provided in the inner face of each roller.

9. A tripod joint according to claim 8, wherein with the exception of the annular grooves for the securing rings, the inner face of each roller is cylindrical along its entire height.

10. A tripod joint according to claim 6, wherein each roller carrier is embraced axially at both ends by the securing rings.

11. A tripod joint according to claim 6, wherein each roller carrier has an outer face which is cylindrical.

12. A tripod joint according to claim 6, wherein the securing rings each comprise a gap whose width is smaller than 60% of the diameter of a needle of the needle bearing.

13. A tripod joint according to claim 12, wherein the direction of the gap extends at an angle relative to the radial ray from the roller axis through the gap.

14. A tripod joint comprising:

an outer joint part with three circumferentially distributed, axis-parallel recesses;

an inner joint part having a star-shaped cross-section with three circumferentially distributed arms engaging the recesses of the outer joint part;

roller assemblies being supported on the arms, each roller assembly including a roller carrier and a roller rotatably supported by a needle bearing on the roller carrier, each said roller being pivotably arranged relative to each said respective arm so as to be axially and angularly movable relative to the arm axis, said rollers having running faces which are shaped like spherical segments and whose sphere center is located on the roller axis;

tracks in the recesses, having concave cylindrical segments line-contacting the running faces of the rollers;

supporting portions for the roller assemblies provided in the recesses so as to extend parallel to the tracks, and with each of the rollers including annular faces adjoining the running faces on both sides thereof, said roller carrier is contact-free relative to the recesses in the outer joint part, said rollers are supported against tilting movements only between the annular faces and the supporting portions in the recesses; and securing means, between each roller carrier and roller, for mutual axial securing thereof, with reference to the roller axis, are formed entirely by securing rings with the outer face of each roller carrier being cylindrical, with each roller carrier being embraced axially at both ends in the direction of the roller axis by the securing rings, and with two annular grooves being provided in the inner face of a roller for the purpose of receiving the securing rings, so that the mutual securing means between a roller carrier and roller are formed by the two securing rings each effective in one direction only along the roller axis.

15. A tripod joint according to claim 12, wherein the securing rings each comprise a gap whose width is smaller than 60% of the diameter of a needle of the needle bearing.

16. A tripod joint according to claim 15, wherein the direction of the gap extends at an angle relative to a radial ray from the roller axis through the gap.

* * * * *

UNITED STATES PATENT AND TRADEMARK OFFICE
CERTIFICATE OF CORRECTION

PATENT NO.  : 5,658,199
DATED       : August 19, 1997
INVENTOR(S) : Michael Ricks and Norbert Hofmann It is certified that error appears in the above-indentified patent and that said Letters Patent is hereby corrected as shown below:

Column 8, line 18, Claim 15, "claim 12" should be --claim 14--.

Signed and Sealed this

Seventeenth Day of February, 1998

Attest:

BRUCE LEHMAN

Attesting Officer

Commissioner of Patents and Trademarks